Dec. 27, 1955  J. C. NILSSON  2,728,144
APPARATUS
Filed Aug. 16, 1954

INVENTOR.
John Charles Nilsson
BY
Adams, Forward & McLean
ATTORNEYS

United States Patent Office 2,728,144
Patented Dec. 27, 1955

2,728,144
APPARATUS

John Charles Nilsson, Poughkeepsie, N. Y., assignor to Nilsson Cage Co., Inc., Poughkeepsie, N. Y.

Application August 16, 1954, Serial No. 449,931

1 Claim. (Cl. 33—143)

This invention relates to the measurement of external linear dimensions particularly between non-parallel surfaces and non-planar surfaces, or both, and in particular provides a measuring device, such as a comparator, having a self-aligning anvil construction by which the device is adapted to measure dimensions such as the pitch diameters of gears.

The construction of measuring devices for ascertaining or comparing external linear dimensions of articles is well known. For example, an indicating device can be linked with the relative separation of a pair of relatively reciprocable anvils having flat confronting surfaces. Such a device can be connected to provide direct measurement or, as is more frequently the case in checking critical dimensions of manufactured parts, it can be used to compare such dimensions against a master. A particular example of such a device is the dial snap gauge disclosed in United States Patent 2,568,558.

Because of the flat confronting anvil surfaces employed, however, such devices are not readily adapted to gauging measurements between non-parallel surfaces or between non-planar surfaces, as for example in measuring the pitch diameters of gears and the thickness of airplane propeller blades. Heretofore such measurements between non-planar or non-parallel surfaces have generally been made by the use of comparators having spherically surfaced anvils often in the form of rotatable balls. Such anvil construction, however, leaves much to be desired since considerable skill and patience are required to obtain minimum or maximum measurements, as the case may be. A spherical surface, moreover, is inherently incapable of self-alignment against any surface but a concave surface.

It is the primary object of this invention, therefore, to provide an anvil construction for comparators and the like which will be inherently self-aligning between non-parallel surfaces and between non-planar surfaces, as well as between parallel or planar surfaces.

This and other objects of this invention are obtained by mounting a cylindrical roller on each of a pair of relatively reciprocable confronting flat anvil surfaces and by providing loose connection between the ends of each roller and the sides of the anvil upon which it rests permitting the roller to rotate freely about its axis on the anvil surface, and also permitting the roller to be displaced angularly across the surface of the anvil.

Figure 1:
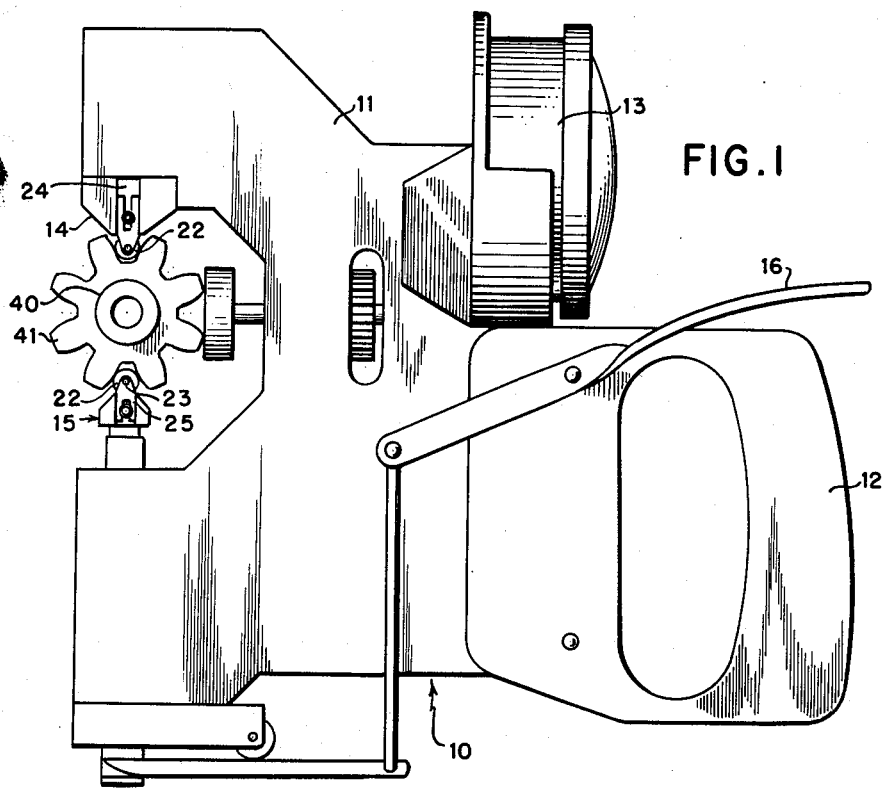
Figure 2:
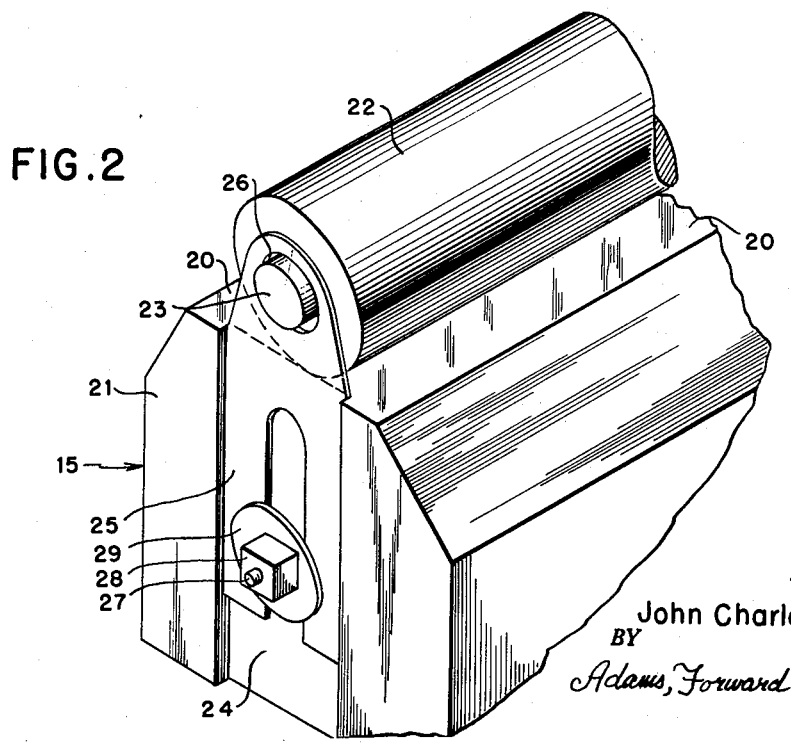

For a fuller understanding of the principles of this invention, reference is made to the appended drawing in which:

Figure 1 is an elevation view of a dial snap gauge embodying the roller anvil construction of this invention; and Figure 2 is an isometric fragmentary view on an enlarged scale of an anvil constructed in accordance with the principles of this invention.

In the drawing the reference numeral 10 indicates an adjustable comparator of the dial snap gauge type constructed generally in accordance with my Patent 2,568,558. Gauge 10 includes a C-frame 11, a handle 12, an indicating dial 13, a fixed anvil 14 and a reciprocable anvil 15. The construction of gauge 10 couples the reciprocation of anvil 15 with an indicator needle (not shown) in dial indicator 13. A pivoted lever 16, linked to anvil 15, permits manual control of the reciprocation of anvil 15 in order to facilitate accommodation of a part to be measured or compared between anvils 14 and 15. This construction is known and needs no further explanation here.

Referring more particularly to Figure 2, each anvil 14 and 15 (anvil 15 is illustrated in Figure 2) is provided with a flat anvil surface 20. Each anvil is also provided with a pair of parallel sides 21 which are perpendicular to anvil surface 20. Resting lengthwise on anvil surface 20 between sides 21 is a cylindrical roller 22. Roller 22 is provided at each end with a hub extension 23. Each side 21 of anvil 14 or 15 includes a flat-bottomed recess 24 which extends at one end into the edge of flat anvil surface 20 at a point approximately beneath hub extension 23 on roller 22. A flat two-tined fork 25, which slips into each flat-bottomed recess 24 in snug sliding fit with the edges thereof, is positioned in each such recess 24 with its tines extending inwardly and with a portion remote from the tines extending outwardly from surface 20. The outwardly extending portion of each fork 25 is provided with a circular opening 26 having a diameter somewhat larger than the diameter of hub extension 23 on roller 22. Forks 25 are adjustably positioned in recesses 24 such that a hub 23 rests freely in opening 26 of each fork 25 with cylindrical roller 22 resting on the flat surface 20 of the anvil between forks 25. The positions of forks 25 are then secured with respect to the anvil by means of suitable studs 27, nuts 28 and washers 29.

In operation a part to be measured, such as a spur gear 40 having teeth 41, is positioned in gauge 10 with rollers 22 resting between two adjacent pairs of diametrically opposed teeth 41, as shown in Figure 1. The gauge is so positioned by pressing downwardly on the outward end of lever 16 to lower anvil 15 as spur gear 41 is inserted between anvils 14 and 15. Lever 16 is then released allowing anvil 15 to fall into place as shown in Figure 1.

The measurement made is usually related to a pre-set master and gives an indication of the pitch diameter of spur gear 40 assuming selection of the proper size rollers 22 has been made for the particular size of teeth on spur gear 40. It will be further apparent that similar measurements can be made on other surfaces which require relative angular displacement in opposite directions of rollers 22, such as pitch diameters of helical gears or the thickness of propeller blades.

Because of the special anvil construction for mounting rollers 22 shown in Figure 2, rollers 22 can rotate about a line perpindicular to their axes through a sufficient angle to accommodate both non-planar and non-parallel surfaces and thus rollers 22 can align themselves in proper position for taking a maximum or minimum external dimension between surfaces of almost any conceivable description, other than concave surfaces.

I claim:

An anvil for a measuring device which comprises means defining a flat anvil surface and having a pair of parallel sides perpendicular to said flat surface, a cylindrical roller positioned lengthwise across said flat anvil surface between said parallel sides, a coaxial hub extension at each end of said roller, a flat-bottomed recess in each of said parallel sides, one end of each of said recesses being extended into the edge of said flat anvil surface beneath a hub extension, a flat elongated member snugly slidable in each said recess and extending therefrom outwardly from said flat anvil surface, an opening in the outward extension of each said flat member loosely receiving a hub of said roller, and means affixing said flat member in said recess permitting said roller to rest freely on said flat anvil surface.

No references cited.